(12) United States Patent
Pinton et al.

(10) Patent No.: US 8,815,457 B2
(45) Date of Patent: Aug. 26, 2014

(54) METHOD FOR STORING A FUEL CELL AT FREEZING TEMPERATURE

(75) Inventors: Eric Pinton, Echirolles (FR); Yannick Fourneron, Vandeins (FR); Armel Guillermo, St Martin d'Heres (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 575 days.

(21) Appl. No.: 12/935,141

(22) PCT Filed: Mar. 31, 2009

(86) PCT No.: PCT/FR2009/000377
§ 371 (c)(1),
(2), (4) Date: Sep. 28, 2010

(87) PCT Pub. No.: WO2009/133274
PCT Pub. Date: Nov. 5, 2009

(65) Prior Publication Data
US 2011/0014547 A1    Jan. 20, 2011

(30) Foreign Application Priority Data
Apr. 3, 2008  (FR) ..................................... 08 01846

(51) Int. Cl.
*H01M 8/04* (2006.01)
*H01M 8/10* (2006.01)

(52) U.S. Cl.
CPC ...... *H01M 8/04253* (2013.01); *H01M 8/04365* (2013.01); *H01M 8/04529* (2013.01); *H01M 8/04649* (2013.01); *H01M 8/04701* (2013.01); *H01M 8/0485* (2013.01); *H01M 2008/1095* (2013.01); *Y02E 60/50* (2013.01); *H01M 8/04641* (2013.01); *H01M 8/0497* (2013.01); *H01M 8/04977* (2013.01); *H01M 8/0432* (2013.01); *H01M 8/04731* (2013.01)
USPC ............................ 429/429; 429/413; 429/442

(58) Field of Classification Search
None
See application file for complete search history.

(56) References Cited

U.S. PATENT DOCUMENTS 7,132,179 B2 * 11/2006 St-Pierre et al. .............. 429/413
2003/0180586 A1 * 9/2003 Hagans et al. .................. 429/13
2006/0115699 A1    6/2006 Matsuoka

FOREIGN PATENT DOCUMENTS

EP           1 672 727 A2    6/2006
WO    WO 2007/091137 A1    8/2007

OTHER PUBLICATIONS

Chen et al., "Studies of Water in Nafion Membranes", Apr. 1993, J. Electrochem. Soc., vol. 140, No. 4, pp. 889-895.*
Tajiri et al., "Isothermal Cold Start of Polymer Electrolyte Fuel Cells," *Journal of the Electrochemical Society*, 2007, vol. 154, No. 2, pp. B147-B152.
Weber et al., "Transport in Polymer-Electrolyte Membranes," *Journal of the Electrochemical Society*, 2004, vol. 151, No. 2, pp. A311-A325.

(Continued)

*Primary Examiner* — Kwang Han
(74) *Attorney, Agent, or Firm* — Oliff PLC

(57) ABSTRACT

The method for storing a fuel cell comprises a first calibration phase of a reference membrane by nuclear magnetic resonance to obtain a progression curve of the maximum water load of the fuel cell membrane versus the temperature of the membrane, and a second calibration phase of a standard reference cell to obtain a relationship between the electrical resistance of the standard reference cell, the water load of its membrane and its temperature. The method then comprises a drying phase dependent on the two calibration phases.

7 Claims, 2 Drawing Sheets

(56) References Cited

OTHER PUBLICATIONS

Pineri et al., "Water sorption-desorption in Nafion® membranes at low temperature, proved by micro X-ray diffraction," *Journal of Power Sources*, 2007, vol. 172, pp. 587-596.

International Search Report in International Application No. PCT/FR2009/000377; dated Dec. 21, 2009 (with English-language translation).

\* cited by examiner

METHOD FOR STORING A FUEL CELL AT FREEZING TEMPERATURE

BACKGROUND OF THE INVENTION

The invention relates to a method for storing a fuel cell comprising at least one cell element provided with a membrane/electrode assembly wherein a membrane is situated between an anode and a cathode.

STATE OF THE ART

A fuel cell is a stack comprising at least one cell element in which an electrochemical reaction takes place between two reactants which are introduced in continuous manner. A cell element is composed of a membrane/electrode assembly in which the membrane is situated between an anode and a cathode. The assembly is conventionally arranged between distribution plates comprising feed channels of the reactants. The membrane, made from solid polymer, is an ionic conductor (electrolyte), for example composed of solid perfluorosulfonated resin such as NAFION® marketed by the Dupont corporation.

To obtain optimal performances of a fuel cell, the membrane of each cell element has to contain a quantity of water close to saturation. During the winter stoppage or storage phases, the liquid water in the heart of the fuel cell may freeze. As described in the article "Water sorption-desorption in Nafion® membranes at low temperature, probed by micro X-Ray diffraction", by Pineri et al., published in 2007 in the "Journal of Power Sources", Vol. 172, P. 587 to 596, when a fuel cell cools down to negative temperatures, the water in the membrane of each cell element desorbs with cooling and forms ice crystals at the external surface of the membrane and at the level of the electrodes. The tetrahedral structure present in liquid water freezes when cooling takes place to form a crystalline solid. This new structure requires a larger volume than that of liquid water and may lead to irreversible damage in the electrodes. Furthermore, when start-up is performed at negative temperatures, the ice may limit access of the gases to the catalytic sites of the cell and therefore limit its performances.

In order to limit the problems of desorption, membrane drying techniques have been proposed. The most commonly used technique consists in purging the fuel cell with a dry gas. Another milder technique consists in purging the fuel cell with a humidified gas to remove a part of the water contained in the membrane, as described in the article "Isothermal Cold Start of Polymer Electrolyte Fuel Cells" by Tajiri et al., published in 2007 in the "Journal of The Electrochemical Society", Vol. 154 P. B147 to B152. The humidity level to be reached is however arbitrary.

OBJECT OF THE INVENTION

The object of the invention consists in adapting the storage method of a fuel cell according to the temperature at which the cell is to be stored, thereby enabling optimal restarting of the fuel cell.

This object is achieved by the fact that, after a first calibration phase of a reference membrane by nuclear magnetic resonance to obtain a progression curve of the maximum water load of the membrane versus the membrane temperature, and a second calibration phase of a standard reference cell to obtain a relationship between the electrical resistance of the standard reference cell, the water load of its membrane and its temperature, the method consists in using the following successive steps in each storage phase of the cell for a given drying temperature:
  determination of a storage temperature,
  determination of a storage water load corresponding to the storage temperature from said progression curve,
  determination of a drying resistance value of the cell to be stored corresponding to the drying temperature and to the storage water load from said relationship,
  drying the fuel cell at the drying temperature until the electrical resistance at the terminals of the cell to be stored is equal to said drying resistance value,
  cooling the cell down to the storage temperature,
  storing the fuel cell at the storage temperature.

According to a development of the invention, the second calibration phase comprises measurements of the electrical resistance of the standard reference cell for a plurality of different water load values and calibration temperatures, each resistance measurement comprising the following successive steps:
  determination of the water load to be attained from the progression curve,
  injecting at least one humidified neutral gas on the anode and/or cathode,
  bringing the standard reference cell to the calibration temperature,
  maintaining injection of the neutral gas until stabilization of the electrical resistance of the standard reference cell is achieved and until a zero voltage is obtained in open circuit,
  maintaining injection of the neutral gas at said stabilized resistance for a predefined period, stopping injection of the neutral gas and recording the resistance of the cell corresponding to said water load and to the corresponding reference temperature.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT

Figure 1:
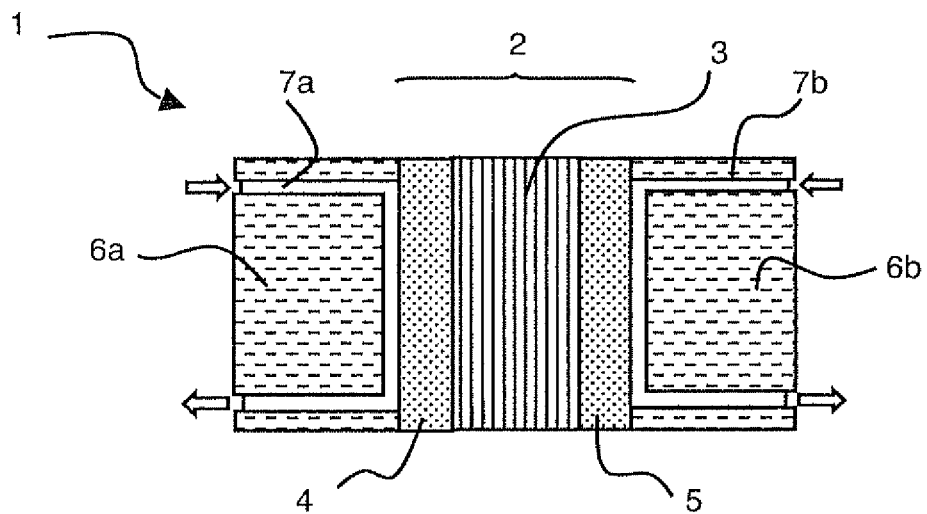
FIG. 1 schematically illustrates a cross-sectional view of a fuel cell according to the prior art.

As illustrated in FIG. 1, a fuel cell comprises at least one cell element 1 provided with a membrane/electrode assembly 2, in which a membrane 3 is situated between an anode 4 and a cathode 5. The cell element can also comprise distributing plates 6a and 6b provided with channels 7a and 7b connected to the electrodes and designed to bring an oxidant and a fuel in contact with the electrodes.

When a fuel cell is stored at a negative temperature, it is important to dry the latter to limit the desorption phenomenon described in the prior art before cooling the fuel cell from its operating temperature Tf to its storage temperature Ts.

The method for storing the fuel cell first of all comprises two calibration phases one hand of a reference membrane and on the other hand of a standard reference cell. The standard reference cell is a cell representative of the fuel cells of the same type which are produced in mass with the same design. The reference membrane is representative of the membrane used in the cell to be stored.

Figure 2:
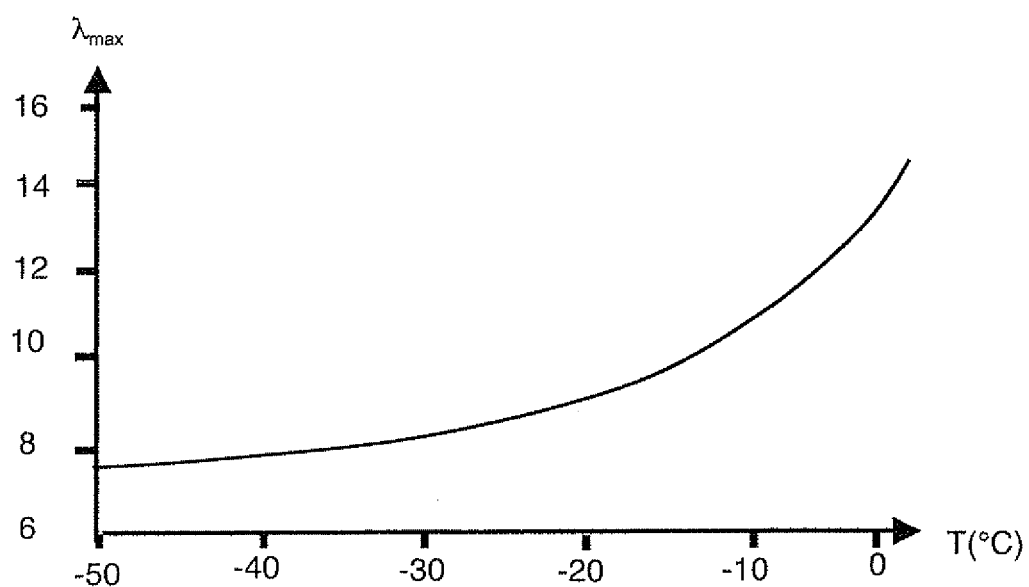
FIG. 2 schematically illustrates a plot of a progression curve of the maximum water load of the membrane of a fuel cell versus its temperature.

In the first calibration phase, the water load λ of a reference membrane versus temperature is determined by nuclear magnetic resonance (NMR), for example by placing the reference membrane in a suitable enclosure. The plot of the progression curve of the maximum water load $\lambda_{max}$ in the membrane is illustrated in FIG. 2 versus temperature T. This maximum water load, which is substantially constant when the temperature is positive, decreases with the temperature when the latter becomes negative. Maximum water load $\lambda_{max}$ corresponds to the maximum quantity of water in liquid form present in the membrane at a given temperature. Measurement by NMR enables the quantity of liquid water to be measured via the quantity of hydrogen atoms.

For example purposes, for a NAFION® membrane of equivalent weight (EW) of 1100 g/eq, for temperatures down to −50° Celsius and according to the initial water load at 20° C., the relationship between maximum water load $\lambda_{max}$ and temperature T comprised between 0 and −50° C. corresponds to the equation:

$$\lambda_{max} = \frac{1}{(0.07 - 0.00274T - 4.15*10^{-5}T^2 - 2.24*10^{-7}T^3)} \quad (1)$$

To prevent desorption of the water contained in the membrane during cooling of the fuel cell from an operating temperature Tf to a storage temperature Ts, the water load of the membrane before cooling has to be lower than or equal to maximum water load $\lambda_{max}(Ts)$ corresponding to a given storage temperature Ts. This value can be determined from the progression curve obtained beforehand and will be attained by drying of the membrane performed at a drying temperature Ta preferably lower than or equal to operating temperature Tf.

Storage water load λs corresponding to the storage temperature can be equal to maximum water load $\lambda_{max}(Ts)$ determined from the progression curve.

According to a development of the invention, storage water load λs can take account of the quantity of water present in vapor form in the channels of the reactant distributing plates. This water in vapor form is in fact liable to condense during cooling to storage temperature Ts of the fuel cell. The storage water load to be attained before storing is then obtained by solving the inequation $$\lambda s \leq \lambda_{max}(Ts) - \Delta\lambda(Ta,Ts,\lambda s) \quad (2)$$

in which the difference Δλ, dependent on the drying temperature, the storage temperature and the storage water load is given by $$\Delta\lambda(Ta, Ts, \lambda s) = \frac{\Delta C_{H2O}(Ta, Ts, \lambda s)EW}{\rho_{memb}} \quad (3)$$

In this inequation, $\rho_{memb}$ corresponds to the density of the dry membrane (kg/m³) and EW corresponds to the equivalent weight of the membrane in kilograms of membrane per mole of charge carriers. $\Delta C_{H2O}(Ta, Ts, \lambda s)$ is the water concentration variation in the membrane during cooling from drying temperature Ta to storage temperature Ts. This variation is generated by condensation of the vapor still present in the channels after drying (moles of water molecules per m³ of membrane). It is given by:

$$\Delta C_{H2O}(Ta, Ts, \lambda s) = \left(\frac{P_v(Ta, \lambda s)}{R \times Ta} - \frac{P_{sat}(Ts)}{R \times Ts}\right) \times \frac{V_{channels}}{V_{memb}} \quad (4)$$

where $V_{channels}$ corresponds to the volume of the channels of the reactant distributing plates in contact with the membrane/electrode assembly of a cell element in m³, and $V_{memb}$ corresponds to the volume of the membrane of a cell element in m³. Temperatures Ta and Ts are expressed in Kelvin. R corresponds to the constant of the perfect gases (8.315 J/mole K). $P_{sat}(Ts)$ corresponds to the saturation pressure (in Pa) at the minimum storage temperature of the cell, T being expressed in Kelvin, given by $$\ln(P_{sat}(T)) = 23.1961 - \left(\frac{3816.44}{-46.13 + T}\right) \quad (5)$$

in the temperature range comprised between 20° C. and 90° C. $P_v(Ta,\lambda s)$ corresponds to the vapor pressure, after drying, in the volume of the channels of the reactant distributing plates in contact with the membrane/electrode assembly of a cell element. For a membrane in equilibrium with the surrounding vapor, its water load can be written in the form $$\lambda = f(HR(T),T) \quad (6)$$

Equation (6) is relatively well known for a membrane made from NAFION®, in particular in the article "Transport in polymer-Electrolyte Membranes" by Weber and Newman, published in 2004 in the "Journal of Electrochemical Society" Vol. 151(2), pages A311-A326. FIG. 2 of this document illustrates the general behavior according to the temperature.

In equation (6), HR corresponds to the relative humidity defined by $$HR(T) = \frac{P_v}{P_{sat}(T)} \quad (7)$$

By introducing equation 7, equation (6) can be written in the form $$P_v(Ta,\lambda s) = g(P_{sat}(Ta),Ta,\lambda s) \quad (8)$$

In the second calibration phase, the standard reference cell, preferably comprising the reference membrane (or an equivalent membrane) used for the NMR measurements enables an empirical law to be established giving the relationship between the electrical resistance of the standard reference cell, its temperature T and water load λ. The electrical resistance of the standard reference cell can be measured at the terminals of the fuel cell or at the terminals of a cell element.

The electrical resistance of a fuel cell Rp or of a cell element Rc is in fact the sum of the following resistances in series:
   resistance Rm of the membrane due to transportation of the ionic charges
   resistance $R_{mat}$ due to transportation of the electronic charges through the conducting materials used to make the electrodes contact resistances $R_{contact}$ due to the contacts between various charge transporter materials able to be present in the fuel cell or cell element.

Membrane resistance $Rm(\lambda,T)$ depends on its water load $\lambda$ and temperature T. Contact resistances $R_{contact}(\lambda,T)$ are essentially a function of the pressing forces between the layers of different materials and vary with the temperature of the materials (dilation) and the water load of the membrane (swelling of the membrane). The resistance of the electronic conducting materials $R_{mat}(T)$ is for its part slightly influenced by the temperature.

The electrical resistance of a fuel cell, or of a cell element, is therefore directly dependent on water load $\lambda$ and temperature T. Measurement of the resistance at the terminals of the fuel cell or of the cell element and knowledge of the relationship $Rp(\lambda,T)$ or $Rc(\lambda,T)$ enables water load $\lambda$ to be determined for a given temperature and resistance measurement.

To obtain the relationship $Rp(\lambda,T)$ or $Rc(\lambda,T)$, the second calibration phase of the standard reference cell comprises measurements of the electrical resistance of the standard reference cell for a plurality of values of water load $\lambda$, at different calibration temperatures Te preferably situated between 20° C. and 90° C. Each resistance measurement comprises the following successive steps:

determination of water load $\lambda$ to be attained from the progression curve. This value can comprise the corrections defined in the foregoing (equation 2) to take account of the water in vapor form still present in channels 7a and 7b, injection of at least one humidified neutral gas on anode 4 and/or cathode 5, preferably via channels 7a and 7b of the distribution plates, to dry the standard reference cell, bringing the standard reference cell to calibration temperature Te, maintaining injection of the neutral gas until stabilization of the electrical resistance of the standard reference cell is achieved and until a zero voltage is obtained in open circuit, maintaining injection of the neutral gas at said stabilized resistance during a predefined period, stopping injection of the neutral gas and recording the resistance of the cell corresponding to water load $\lambda$ and to corresponding calibration temperature Te.

It may happen that at the end of the second calibration phase defined above, the measured resistance is not stable but decreases after injection of the neutral gas has been stopped. This decrease can be due to the fact that liquid water has remain trapped in very small pores of the electrodes. This residual water the rehydrates the membrane after gas injection has ceased. In this situation, drying of the standard reference cell has to be resumed from the second step of the second calibration phase (injection of a neutral gas).

The humidified neutral gas preferably has a relative humidity dependent on the value of water load $\lambda$ to be attained as seen beforehand in the article by Tajiri. The relative humidity can also depend on calibration temperature Te (equation 6 above).

The humidified neutral gas used is preferably nitrogen.

Injection of the humidified neutral gas is preferably performed at a pressure as close as possible to atmospheric pressure. The value of the gas injection flow rates is of little importance and only has an effect on the drying time. Advantageously, a flow rate of more than 5 m/s in the channels is a good trade-off.

Injection of the neutral gas can be maintained for about 3 hours after the resistance has been stabilized. This maintained injection among other things enables the water molecules trapped in the pores of the electrodes to be evacuated to prevent rehydration of the membrane and damage to the electrodes when the cell temperature becomes negative.

Figure 3:
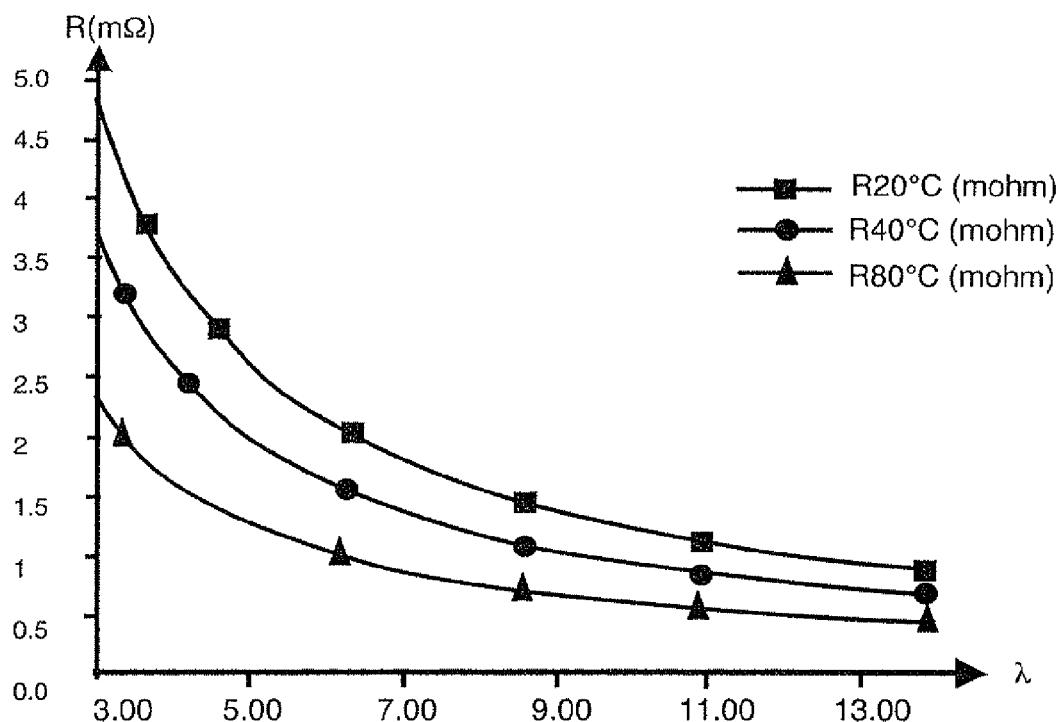
FIG. 3 represents curve plots illustrating the relationship between the electrical resistance of a fuel cell versus its water load and its temperature, established by means of calibration of the fuel cell.

The second calibration phase for example enables progression curves of the resistance to be established versus the temperature and water load $\lambda$ (FIG. 3). FIG. 3 illustrates three representative of the progression of the resistance versus the water load for the temperatures 20° C., 40° C. and 80° C.

Once the two calibration phases have been performed, a storage resistance can be determined for all the fuel cells whose design is similar to the standard reference cell and which are designed to be stored at negative temperatures. Each time a fuel cell has to be stored, the cell storage phase to be used comprises the following successive steps, for a given drying temperature Ta:

determination of a storage temperature Ts, determination of a water storage load $\lambda s$ corresponding to storage temperature Ts from the progression curve of the maximum water load according to the temperature $\lambda(Ts)$ obtained by NMR. This storage water load $\lambda s$ is preferably lower than or equal to water load $\lambda_{max}$ obtained by means of the progression curve, and advantageously takes account of the corrections depending on the quantity of water in vapor form present in the channels of the reactant distributing plates according to equation (2) above, from the relationship between the electrical resistance of the standard reference cell, determination of a drying resistance value Ra of the cell corresponding to drying temperature Ta, and of storage water load $\lambda s$. This drying resistance value Rs is determined from the curves established in the second calibration phase (FIG. 3), drying P1 of the fuel cell at temperature Ta until the electrical resistance at the terminals of the cell is equal to said drying resistance value Ra, cooling P2 to storage temperature, then storage of the fuel cell at storage temperature Ts.

For example purposes, for a cell with an active surface of 220 cm$^2$ the membrane/electrode assemblies whereof contain a NAFION® membrane 112, with distribution channel volumes of 53 cm$^2$ per distributing plate, gases at a drying temperature Ta of 50° C. and a storage temperature Ts of −20° C., $\lambda_{max}(-20°$ C.$)=9.09$ and $\Delta\lambda(50°$ C., $-20°$ C.$)=0.18$ are obtained, i.e. a corresponding storage water load $\lambda s \leq 8.91$. Drying of the membrane above 8.91 leads to desorption of the membrane when cooling to storage temperature whereas drying below 8.91 increases the energy losses when drying and cold starting of the fuel cell is degraded. Too severe drying can also give rise to irreversible damage.

Figure 4:
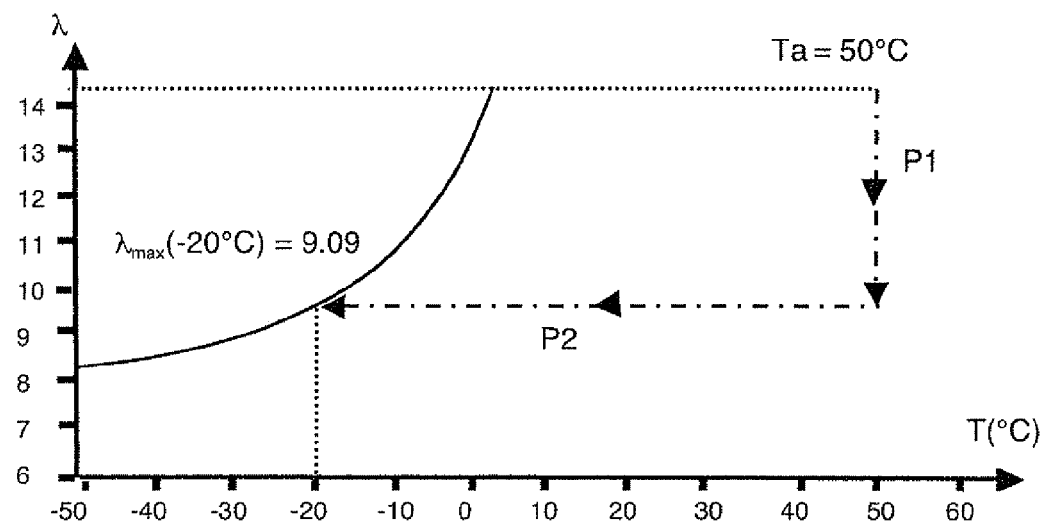
FIG. 4 schematically illustrates different steps of the drying method of a fuel cell for storage at −20° C.

In the particular example illustrated in FIG. 4, drying temperature Ta of the fuel cell is 50° C., storage temperature is −20° C. and corresponding maximum water load is $\lambda_{max}(-20°$ C.$)=9.09$. The fuel cell is then dried during drying phase P1 as defined above until the electrical resistance at the terminals of the cell is equal to drying resistance $Ra(\lambda s, Ta)$ where $\lambda s = \lambda_{max}$. Once dried, the fuel cell can be cooled during a cooling phase P2 to its storage temperature Ts, i.e. to the predefined temperature of −20° C.

The storage method and its alternative embodiments described above can for example be implemented in the automobile industry. In general manner, the method relates to all fuel cells with solid polymer membrane or proton exchange membrane liable to operate in an environment in which they are subjected to temperatures below 0° C. in shut-down phase.

This method guarantees non-desorption of the water in the membrane during cooling, thereby preventing damage to the electrodes. It limits energy spending during drying phase P1 and enables a maximum performance of the cell to be obtained by drying the latter in optimal manner. The invention eliminates the risk of damage induced by too severe drying of the cell and is applicable whatever the drying method used and whatever the temperature of the cell chosen during the drying phase.

The above method can be applied to cells comprising membrane/electrodes assemblies with any type of membrane if the water load versus temperature progression curve and the relationship $\lambda=f(HR,T)$ are known.

The invention claimed is:

1. Method for storing a fuel cell comprising at least one cell element provided with a membrane/electrode assembly wherein a membrane is situated between an anode and a cathode, wherein, after a first calibration phase of a reference membrane, the reference membrane being representative of a membrane used in the fuel cell to be stored, by nuclear magnetic resonance to obtain a first progression curve of the maximum water load of the membrane versus the membrane temperature, and a second calibration phase of a standard reference cell to obtain a second progression curve of the electrical resistance of the standard reference cell, the water load of its membrane and its temperature, the method comprises the following successive steps in each storage phase of the fuel cell for a given drying temperature:
   determination of a storage temperature,
   determination of a storage water load corresponding to the storage temperature from said first progression curve,
   determination of a drying resistance value of the fuel cell to be stored corresponding to the drying temperature and to the storage water load from said second progression curve,
   drying the fuel cell at the drying temperature until the electrical resistance at the terminals of the fuel cell to be stored is equal to said drying resistance value,
   cooling the fuel cell down to the storage temperature,
   storing the fuel cell at the storage temperature,
   wherein the second calibration phase comprises measurements of the electrical resistance of the standard reference cell for a plurality of different water load values and calibration temperatures, each resistance measurement comprising the following successive steps:
      determination of the water load to be attained from the progression curve,
      injecting at least one humidified neutral gas on the anode and/or cathode,
      bringing the standard reference cell to the calibration temperature,
      maintaining injection of the neutral gas until stabilization of the electrical resistance of the standard reference cell is achieved and until a zero voltage is obtained in open circuit,
      maintaining injection of the neutral gas at said stabilized resistance for a predefined period, stopping injection of the neutral gas and recording the resistance of the standard reference cell corresponding to said water load and to the corresponding reference temperature,
   thereby obtaining the second progression curve defining a relationship of the electrical resistance versus the storage temperature and the storage water load.

2. Method according to claim 1, wherein the relative humidity of the humidified neutral gas is determined from the calibration temperature and from the corresponding water load.

3. Method according to claim 1, wherein the calibration temperature is comprised between 20° C. and 90° C.

4. Method according to claim 1, wherein the membrane of the fuel cell is a Nafion® membrane.

5. Method according to claim 1, wherein the neutral gas used during the second calibration phase is nitrogen.

6. Method according to claim 1, wherein the humidified neutral gas flows at a speed of more than 5 m/s at a pressure close to atmospheric pressure in at least one channel situated in a distributing plate and connected to the cathode or the anode.

7. Method for storing a fuel cell comprising:
   providing the fuel cell provided with a membrane/electrode assembly wherein a membrane is situated between an anode and a cathode;
   providing a progression curve defining a maximum liquid water load of the membrane versus a temperature of the membrane, the progression curve being obtained by nuclear magnetic resonance;
   providing a calibration curve defining a relationship between the electrical resistance of the fuel cell and the maximum liquid water load at a temperature;
   defining of a storage temperature of the fuel cell and a drying temperature of the fuel cell, the drying temperature being higher than the storage temperature;
   calculating a maximum storage water load of the membrane of the fuel cell corresponding to the storage temperature by means of the progression curve;
   calculating a drying resistance value of the fuel cell to be stored corresponding to the drying temperature and to the calculated maximum storage water load by means of the calibration curve;
   cooling the fuel cell at the drying temperature and drying the fuel cell at the drying temperature until electrical resistance at terminals of the fuel cell is equal to the drying resistance value;
   cooling the fuel cell down to the storage temperature; and
   storing the fuel cell at the storage temperature.

* * * * *